United States Patent
Shortman (10) Patent No.: US 7,578,473 B2
(45) Date of Patent: Aug. 25, 2009

(54) RIB FOR AIRCRAFT WING AND METHODS FOR THE MANUFACTURE THEREOF

(75) Inventor: David James Shortman, Bristol (GB)

(73) Assignee: Airbus UK Limited, Bristol (GB)

( * ) Notice: Subject to any disclaimer, the term of this patent is extended or adjusted under 35 U.S.C. 154(b) by 692 days.

(21) Appl. No.: 11/020,988

(22) Filed: Dec. 22, 2004

(65) Prior Publication Data

US 2009/0189019 A1    Jul. 30, 2009

(30) Foreign Application Priority Data

Dec. 23, 2003  (GB) ................................ 0329900.5

(51) Int. Cl.
B21D 53/78    (2006.01)
B21D 53/88    (2006.01)
(52) U.S. Cl. ..................... 244/123.1; 29/889; 29/889.7; 29/897.2; 244/119; 244/123.14; 244/131
(58) Field of Classification Search ................ 29/897.2, 29/889, 889.7, 889.71, 889.72, 889.21; 244/119, 244/123.1, 123, 123.3, 123.4, 123.7, 123.8, 244/118.1, 123.12, 123.13, 123.14, 131, 244/35 R, 132; 156/184, 189
See application file for complete search history.

(56) References Cited

U.S. PATENT DOCUMENTS 4,806,077 A    2/1989  Bost
6,082,938 A    7/2000  Fink
7,195,203 B2*  3/2007  Livingstone et al. ........ 244/124
7,398,586 B2*  7/2008  Prichard et al. ............... 29/448

FOREIGN PATENT DOCUMENTS

GB    157310    6/1922
GB    369051    3/1932
GB    2276600   10/1994

OTHER PUBLICATIONS

Prior Art Rib, View of Typical Rib, p. 1 of 1, prior to Dec. 12, 2003.

* cited by examiner

*Primary Examiner*—David P Bryant
*Assistant Examiner*—Alexander P Taousakis
(74) *Attorney, Agent, or Firm*—Patterson, Thuente, Skaar & Christensen, P.A.

(57) ABSTRACT

There is provided a method of manufacturing a rib for an aircraft wing, the method comprising providing a billet of material for forming the rib, machining away material from all sides of the billet to form a rib for use in an aircraft, the rib including a web that extends between first and second flanged portions, each flanged portion having a flange that facilitates fixing of the rib to another component of the aircraft, wherein the material that forms the web extends diagonally across the billet, the web having a first face on a first side and a second face on a second side opposite to the first side of the web, and the first flanged portion extends more to the first side of the web than to the second side and the second flanged portion extends more to the second side of the web than to the first side.

18 Claims, 3 Drawing Sheets

Figure 1

PRIOR ART

RIB FOR AIRCRAFT WING AND METHODS FOR THE MANUFACTURE THEREOF

BACKGROUND OF THE INVENTION

The present invention relates to a rib and in particular, but not exclusively, a rib for a wing of a large aircraft, and to methods for the manufacture thereof.

Ribs typically form part of a structure that supports and defines the shape of an aerofoil surface. For example, ribs are may be provided in the aircraft wing or wing box of an aircraft, the ribs providing support for the upper and lower wing skins. A rib of the prior art will now be described. The rib comprises a generally planar web structure disposed between a series of rib feet associated with the upper wing skin and a series of rib feet associated with the lower wing skin. The rib feet are, in use, attached to other components of the aircraft wing box, such as stringers. The rib feet at one end of the rib project at an angle of less than 90 degrees from the surface of the main rib body, with the rib feet associated with the upper wing skin extending from the same side of the web as the rib feet associated with the lower wing skin. The rib is machined from a solid cuboidal one-piece block of metal material, known as a billet, in order to provide strength and to remove the problems associated with joining components that are made separately. The rib web is formed from metal that lies near the surface on a first side of the billet, and the ends of the rib feet are formed from metal near the surface on the opposite side. Thus a relatively small amount of machining is conducted on the first side of the billet to form the web. Such a rib may suffer from distortion problems which have to be accounted for during the rib machining process because the metal at and close to the surfaces of the billet is subject to residual stresses (resulting from the process used to manufacture the billet) that may cause deformation of, or undesirable internal stresses in, the web produced therefrom.

Furthermore, such ribs are usually provided with stiffeners that add strength to the rib. In the above-described rib of the prior art, these stiffeners project from one side of the web and are formed from material in the billet on the opposite side of the web to the first side of the billet. Thus, whilst the inclusion of such stiffeners does not require a larger billet, the neutral axis of the stiffeners is displaced from the plane of the web. As a result, the stiffeners need to be stronger, and therefore larger and heavier, than stiffeners provided on either side of the web.

One possible way to reduce such problems is to provide an extra (second) series of rib feet associated with the upper wing skin and an extra (second) series of rib feet associated with the lower wing skin, these extra rib feet projecting from the opposing side of the rib web from which the first series of feet project. Such a rib has a substantially 'H' shaped cross-section and suffers less from some of the problems of the afore-mentioned rib of the prior art, but suffers from the problem that two sets of rib feet are associated with each wing skin thus increasing the complexity of the machining task, increasing the weight of the rib, and requiring a larger and more expensive billet from which to machine the rib. As the size of the billet (especially in terms of its thickness) increases, the structural properties of the resulting metal may not be as good as those of a billet of a smaller size. Thus, if the billet has to be larger to accommodate a certain shape and size of rib, then the rib may need to be made more massive in order to compensate for the reduced structural strength of the metal from the larger-sized billet.

SUMMARY OF THE INVENTION

It is an object of the present invention to provide a rib, and/or a method for the manufacture of a rib, which overcome or mitigate some or all of the above-mentioned disadvantages.

According to a first aspect of the present invention there is provided a method of manufacturing a rib for use in an aircraft, the method comprising:

providing a billet of material for forming the rib, machining away material from all sides of the billet to form a rib for use in an aircraft, the rib including a web that extends between first and second flanged portions, each flanged portion having a flange that facilitates fixing of the rib to another component of the aircraft, wherein the material that forms the web extends diagonally across the billet, the web having a first face on a first side and a second face on a second side opposite to the first side of the web, and the first flanged portion extends more to the first side of the web than to the second side and the second flanged portion extends more to the second side of the web than to the first side.

"Diagonally" is intended to mean non-parallel to any of the four longitudinally extending sides of the billet. This enables the web to be formed from material at least some of which is remote from the surface of the billet. It also enables the web to be formed from material from the billet at a variety of depths from the surface of the billet. A web formed from material solely at the surface of the billet may, as a result of the distribution of the residual stresses throughout the billet, be subject to undesirable stresses that cause undesirable deformation of the rib after machining. Thus, manufacturing the web from material that is remote from the surface and/or extends across the depth of the billet by performing the method of the present invention may reduce the likelihood of the manufactured web being subject to such deformations or may reduce the magnitude of the deformations so caused. Preferably, the material that forms the web extends from a region near one edge (where two substantially planar surfaces meet) to a diagonally opposite edge of the billet.

Preferably, the material that forms the web extends across the middle of the billet. "Middle" in this instance is not to be limited to a meaning of being geometrically central. Preferably, the material that forms the web extends from a region near a surface of the billet, which surface is roughly aligned with the web of the rib to be formed, across the middle of the billet, and to a region near the opposite surface of the billet. Thus the web may be formed from material from the billet at a variety of depths from the surface of the billet. The surface of the billet that is roughly aligned with the web of the rib to be formed will normally be the surface with the largest cross-sectional area.

The term "machining away" is intended to refer to any process that is capable of removing material from a billet, such as milling and drilling, for example. It will be understood that material may be machined away from all sides of the billet by means of a machine that works on two sides only of the billet, for example the upper and lower sides of the billet.

The present invention advantageously enables a rib to be made from a smaller, or similar-sized billet as that that would be used to manufacture a prior art rib having the same load bearing properties. The method of the present invention may also produce a rib having reduced stress in the web, and/or reduced undesirable deformations, caused by the residual stresses in the billet, when compared to a rib made in accordance with methods of the prior art.

The depth of billet used will of course depend on the desired structural properties of the rib to be formed. By way of example, the billet may have a depth of less than 120 mm. The billet may have a depth of less than 100 mm.

The sum volume of all of the flanged material, at the same end of the rib as the first flanged portion, extending to the first side may be significantly greater than the sum volume of material, if any, of the sum volume of all of the flanged material, at the same end of the rib as the first flanged portion, extending to the second side. Similarly, the sum volume of all of the flanged material, at the same end of the rib as the second flanged portion, extending to the second side is preferably significantly greater than the sum volume of material, if any, of the sum volume of all of the flanged material, at the same end of the rib as the second flanged portion, extending to the first side. Providing flanged portions predominantly on one side of the rib at each end of the rib may reduce the weight of the rib, when compared to a rib having flanged portions on both sides at both ends of the rib. Furthermore, providing a rib whereby the volume of flanged material at one end of the rib extends predominantly to the first side and whereby the volume of flanged material at the other end of the rib extends predominantly to the second side enables the method of the present invention to be used to produce ribs that are compatible with existing wings and wing boxes from existing billets.

The first and second flanged portions may be defined by a unitary flanged structure and individual flanges may not be readily discernable. Preferably, however, a plurality of separately discernable flanges are provided at each end of the web.

The first flanged portion advantageously extends substantially entirely to the first side. It is further preferred that substantially all of the flanged portions at the same end of the rib as the first flanged portion extend substantially entirely to the first side. This may reduce the complexity of the machining process and may reduce the weight of the rib. Similarly, preferably, substantially all of the flanged portions at the same end of the rib as the second flanged portion extend substantially entirely to the second side.

It is preferred that the first and second flanged portions each extend from the web at an angle of at least 90 degrees relative to the web. This facilitates easier manufacture of the rib and facilitates easier access to the web and other aircraft components during and after installation of the rib in an aircraft wing box.

It is further preferred that each of the first and second flanged portions extend from the web at an angle of between about 95 degrees and about 120 degrees. Such a feature, may facilitate simple machining and easy access to the web during and after installation of the rib, while enabling relatively simple attachment of the rib to other aircraft components.

The web of the rib may include a first strengthening formation on the first side and a second strengthening formation on the second side. Such strengthening formations typically provide strength and stiffness to the rib.

The rib may include strengthening formations both on the first side and on the second side and the sum volume of material of all of the strengthening formations on the first side may be within a factor of ten of the sum volume of material of all of the strengthening formations on the second side. This provides a degree of weight distribution between the two sides.

It is preferred that the sum volume of material of all of the strengthening formations on the first side is within a factor of two of the sum volume of material of all of the strengthening formations on the second side. It is further preferred that the sum volume of material of all of the strengthening formations on the first side is about equal to the sum volume of material of all of the strengthening formations on the second side. Having an even distribution of strengthening material on each side of the rib enables the strengthening formation to be less massive than would be the case were the strengthening formations provided on one side only.

The rib may include a plurality of strengthening formations on the first side and on the second side, each of the strengthening formations on the first side being associated with a corresponding strengthening formation on the second side. This may provide a relatively even distribution of weight of the strengthening material across the rib and may also enable loads to be evenly distributed between the strengthening formations in a pair associated with each other.

The pairs of associated strengthening formations on the first and second sides are preferably positioned immediately opposite each other, being separated by the web of the rib. This may permit the neutral axis of the associated formations to be approximately in the plane of the web and may allow the cross-sectional area of the strengthening formations to be reduced.

It is further preferred that the plurality of strengthening formations on the first side are preferably symmetrical to the plurality of strengthening formations on the second side. This may help reduce any undesirable stresses associated with asymmetric loading or weighting of the rib. Such a symmetrical arrangement may also enable a desired structural property to be provided, whilst keeping the increase in mass in the structure to a minimum.

It will be appreciated that there are various advantages enabled by the present invention which do not necessarily require the machining of the billet to form a web diagonally across the billet. For example, some advantageous features require only that a portion of the web is formed from a portion of the billet that is remote from the surface or sides of the billet or that the web is formed from material from the billet at a variety of depths from the surface of the billet. Furthermore, other advantageous features of the invention do not necessarily require flanges to be provided on opposite sides of the rib. Thus, according to a second aspect of the invention there is provided a method of manufacturing a rib for use in an aircraft, the method comprising:

providing a billet of material for forming the rib, machining away material from all sides of the billet to form a rib for use in an aircraft, the rib including a web that extends between first and second flanged portions, each flanged portion having a flange that facilitates fixing of the rib to another component of the aircraft, the material that forms the web including at least a portion that is positioned in a region remote from any side of the billet, the web having a first face on a first side and a second face on a second side opposite to the first side of the web, wherein the rib has a first formation extending more to the first side than to the second side of the web and a second formation extending more to the second side than to the first side of the web, the first and second formations being of the same type.

Preferably, the web is formed from material from the billet at a variety of depths from the surface of the billet, for example depths that extend across the middle of the billet. The web may additionally be formed from material from the billet at depths near to the surface of the billet. It is preferred that the material that forms the web extends diagonally across the billet.

The reference to the first and second formations being of the "same type" is intended to mean that the first and second formations have the same general function. For instance, both the first and second formations may be strengthening formations. Alternatively, both the first and second formations may be flanged portions for attaching the rib to another component of the aircraft wing box.

Features of the first aspect of the invention may be incorporated into the second aspect. For example, where appropriate features described with reference to the flanged positions of the first aspect may be incorporated as features relating to the first and/or second formations of this second aspect of the invention. Also, features relating to the strengthening formations of the first aspect may be incorporated in the formations of this second aspect.

It is preferred that all of the first formation extends solely to the first side. It is further preferred that all of the second formation extends solely to the second side.

As indicated above, the first and second formations may comprise first and second strengthening formations, respectively.

According to a third aspect of the present invention there is provided a rib for use in an aircraft, the rib comprising a web extending between first and second flanged portions, each flanged portion having a flange that facilitates fixing of the rib to another component of the aircraft, the web having a first face on a first side and a second face on a second side opposite to the first side of the web, wherein the sum volume of all of the flanged material, at the same end of the rib as the first flanged portion, extending to the first side is significantly greater than the sum volume of material, if any, of the sum volume of all of the flanged material, at the same end of the rib as the first flanged portion, extending to the second side, and the sum volume of all of the flanged material, at the same end of the rib as the second flanged portion, extending to the second side is significantly greater than the sum volume of material, if any, of the sum volume of all of the flanged material, at the same end of the rib as the second flanged portion, extending to the first side.

This allows the rib to be made from a smaller, or similar-sized, billet as those currently used but with reduced stress in the web, and/or reduced undesirable deformations, caused by the residual stresses in the billet.

The present invention yet further provides according to fourth aspect of the invention a rib for use in an aircraft, the rib comprising a web extending between first and second flanged portions, each flanged portion having a flange that facilitates fixing of the rib to another component of the aircraft, the web having a first face on a first side and a second face on a second side opposite to the first side of the web, wherein the web includes a first strengthening formation that extends out from the first face of the web and a second strengthening formation that extends out from the second face of the web.

The features of the methods of the first and second aspects of the invention may be incorporated into the ribs of the third and fourth aspects of the present invention. For example, the rib may be machined from a solid billet, wherein the web and flanged portions are defined by a monolithic structure. It is preferred, for example, that substantially all of the flanged portions at the same end of the rib as the first flanged portion extend substantially entirely to the first side. Likewise, it is further preferred that substantially all of the flanged portions at the same end of the rib as the second flanged portion extend substantially entirely to the second side.

For reasons given above in relation to the methods in accordance with the present invention, each of the first and second flanged portions preferably extends from the web at an angle of at least 90 degrees relative to the web. Both of the first and second flanged portions may extend from the web at an angle of between about 95 degrees and about 120 degrees.

The web of the rib may include a first strengthening formation on the first side and a second strengthening formation on the second side. This provides strength and stiffness to the rib.

The rib may include strengthening formations both on the first side and on the second side and the sum volume of material of all of the strengthening formations on the first side may be within a factor of ten of, is preferably within a factor of two of, or more preferably is about equal to, the sum volume of material of all of the strengthening formations on the second side.

The rib may include a plurality of strengthening formations on the first side and on the second side, each of the strengthening formations on the first side being associated with a corresponding strengthening formation on the second side. The pairs of associated strengthening formations on the first and second sides are preferably positioned immediately opposite each other, being separated by the web of the rib. This allows the neutral plane of the associated formations to be located approximately in, or near to, the web. This allows the strengthening formations to have a lower cross-section than might otherwise be the case.

The plurality of strengthening formations on the first side are preferably symmetrical to the plurality of strengthening formations and on the second side.

In the embodiment described below, at the end of the rib comprising the first flanged portion there are provided rib feet, all of which are positioned in a single row of feet extending at greater than 90 degrees to the web on the first side. Also, with reference to that embodiment, at the end of the rib comprising the second flanged portion there are provided rib feet, all of which being positioned in a single row of feet extending at greater than 90 degrees to the web on the second side.

The invention also provides, according to a fifth aspect, a rib resulting from the method of manufacture in accordance with the first or second aspect of the present invention.

It will be clear to those skilled in the art that the features of the rib described above in relation to the third and fourth aspects of the present inventions may be incorporated into the methods of manufacture of the present invention.

According to a sixth aspect of the present invention there is provided an aircraft structure defining an aerofoil surface, the structure comprising a skin, and at least one rib according to the present invention. The structure defining an aerofoil surface may for example be a wing, a fin or a part of a tail-plane. The invention is of particular advantage in the case where the rib forms part of the wing, or wing box, of an aircraft. The skin may for example be in the form of at least a portion of the wing skin of the wing. The present invention thus also provides in accordance with this sixth aspect an aircraft wing box comprising a wing skin, and at least one rib according to the present invention.

The invention also provides, according to a seventh aspect, a method of manufacturing an aircraft structure defining an aerofoil surface, comprising manufacturing at least one rib in accordance with the method of the present invention and then attaching a skin to the rib.

The aircraft structure defining an aerofoil surface may also include one or more spars extending transversely to the at least one rib. The aircraft structure defining an aerofoil surface may also include one or more stringers extending transversely to the at least one rib. The aircraft structure defining an aerofoil surface may of course be in the form of a wing box, a fin or a part of a tail-plane.

DESCRIPTION OF THE FIGURES

An embodiment of the present invention will now be described by way of example only with reference to the following figures of which.

DETAILED DESCRIPTION OF THE PREFERRED EMBODIMENT

Figure 1:
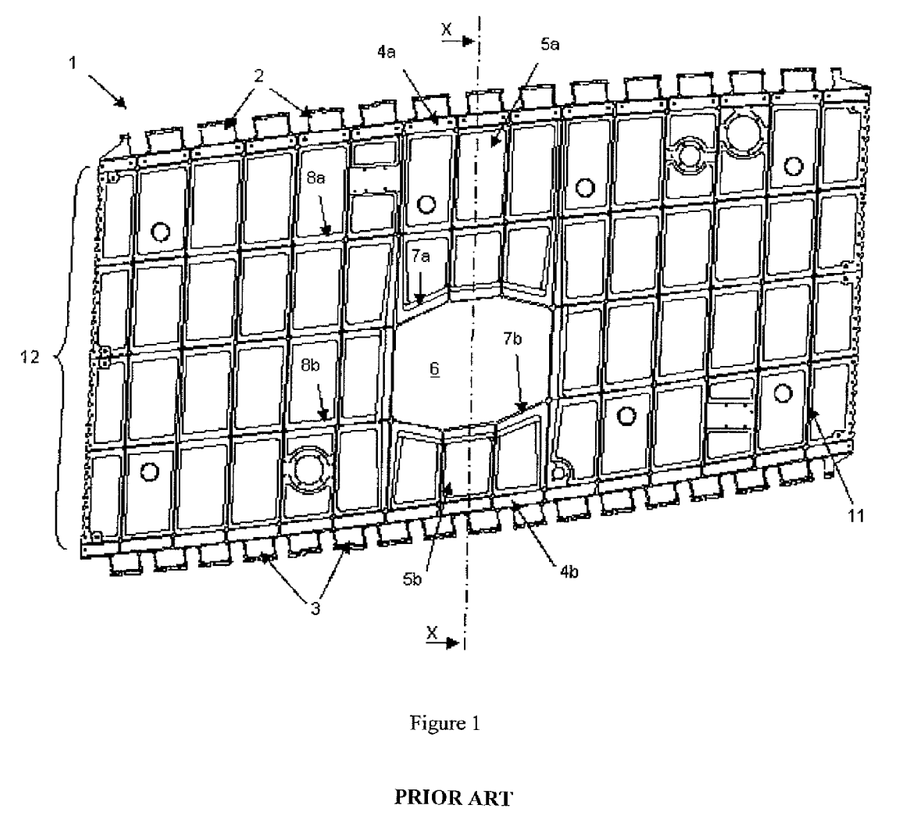
FIG. 1 is a perspective view of a rib of the prior art for use in an aircraft.

FIG. 1 shows a perspective view of a known rib. The rib 1 has a generally planar structure and comprises a web 12 disposed between a first series of rib feet 2, and a second series of rib feet 3. Rib feet 2, 3 are, during use, attached to stringers (not shown) and to the upper and lower wing skin respectively. The web 12 comprises a series of panels (two of which are labeled 5a, 5b) separated by horizontal stiffeners (four of which are labeled 4a, 4b, 8a, 8b) and vertical stiffeners (one of which is labeled 11). The terms "vertical" and "horizontal" are used merely to define the approximate orientations of the stiffeners when the rib 1 is fitted in a (static) aircraft. The stiffeners 4a, 4b, 8a, 8b, 11 provide strength to the rib 1. The rib 1 of FIG. 1 is further provided with an aperture 6 defined by a series of stiffeners 7 (including stiffeners 7a, 7b) that forms the perimeter of the aperture 6. The aperture 6 is in the form of a "manhole" as is standard in the art.

Figure 2:
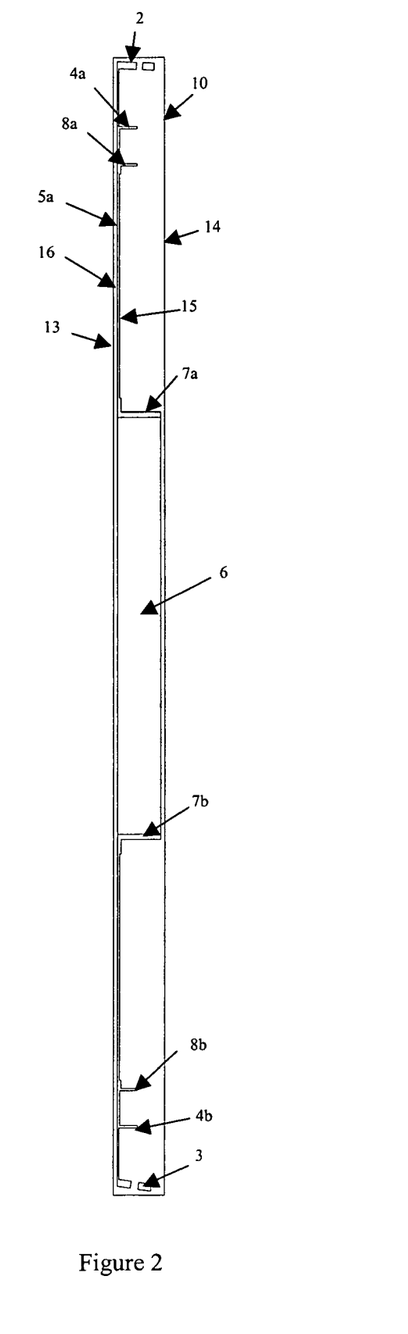
FIG. 2 is a schematic cross-section of a rib similar to that shown in FIG. 1 taken along a vertical plane perpendicular to the web of the rib plane (denoted by line X-X in FIG. 1), FIG. 2 showing the spatial relationship between the rib and the block of material (billet) from which the rib is machined.
Figure 3:
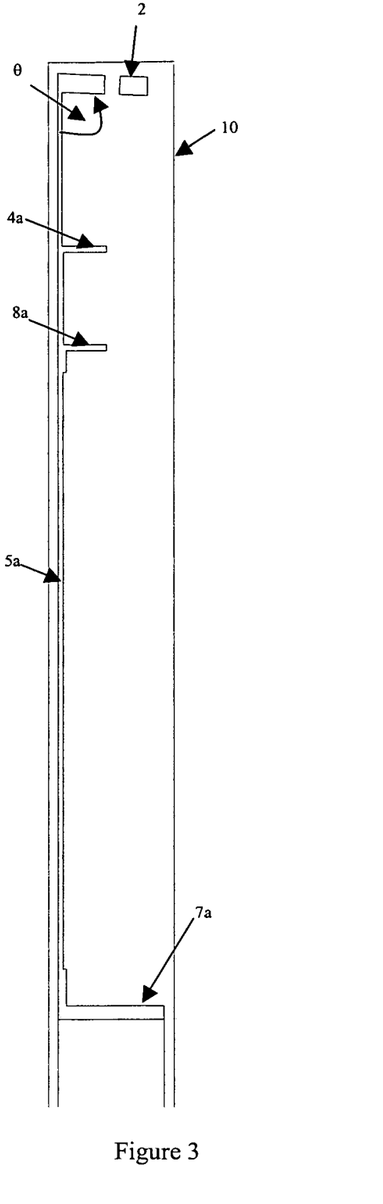
FIG. 3 is an enlarged view of a portion of the cross-section of FIG. 2.

A section through a rib 1 similar to that shown in FIG. 1 is shown in FIGS. 2 and 3, the section being taken along a line oriented similarly to that of the line X-X in FIG. 1. The rib of FIGS. 2 and 3 differs from that shown in FIG. 1 by having three rows of panels, rather than four, between the upper and lower rib feet. FIG. 2 shows the general relative orientation of the rib feet 2, 3, panels 5a, 5b, and stiffeners 4a, 4b, 7a, 7b, 8a, 8b, and their orientation in relation to the billet 10 from which the rib 1 has been machined. Those skilled in the art will realize that the billet 10 is not part of the rib because the rib 1 is machined from the billet 10, but is included in FIGS. 2 and 3 to help show the relationship between the billet 10 and the rib 1 produced therefrom.

The billet 10 is machined so that the web 12 (and associated panels 5a, 5b) are formed near the surface 13 of the billet 10. This has been found to be a convenient and efficient way to manufacture the rib 1 because little material is removed from the surface 13 of the billet 10 to form the web 12, thus reducing the minimum size of the billet 10 that may be used for a particular rib and reducing the amount of machining that must be carried out to form the web 12. The rib feet 2, 3 and stiffeners 4a, 4b, 7a, 7b, 8a, 8b are, for the most part, formed by machining the surface 14 of billet 10 to produce a rib 1 provided with a web 12 disposed between rib feet 2, 3, wherein the rib feet (as represented by 2, 3) extend from the same side 15 of the web 12. Furthermore, stiffeners 4a, 4b, 7a, 7b, 8a, 8b project from the same side 15 of the web 12.

Those skilled in the art will be familiar with the techniques, such as drilling and milling, used to machine a rib from a billet.

Forming the web 12 so close to the surface 13 of the billet 10 dictates that metal from, or close to, the surface 13 of the billet 10 must be incorporated into the web 12. Such metal is subject to relatively high residual stresses by virtue of its position within the billet 10 and the method of manufacture of the billet and so the web 12 is subject to such stresses, thus causing the web to distort. Such distortions are to some extent quantifiable and predictable and it is thus possible to take them into account when machining a rib. As will be appreciated by the skilled reader, the longitudinal, transverse and shear residual stresses vary with distance from the surface of the billet and are often significant at or near the surface of the billet.

The respective angles between the upper and lower rib feet, 2, 3 respectively, and the rib web 12 are dependent on the angle of the upper and lower wing skins, which in this case are both inclined to the horizontal. FIG. 3 shows an enlarged view of a portion of the cross-section of FIG. 2. FIG. 3 shows that the angle between the upper rib foot 2 and the web 12 (labeled as theta) is less than 90 degrees. This restricts access to the rib 1 and other components of the aircraft wing during and after the fitting of the rib 1 to an aircraft. The lower rib foot 3 is positioned at an angle of greater than 90 degrees to the web 12.

Figures 4, 5:
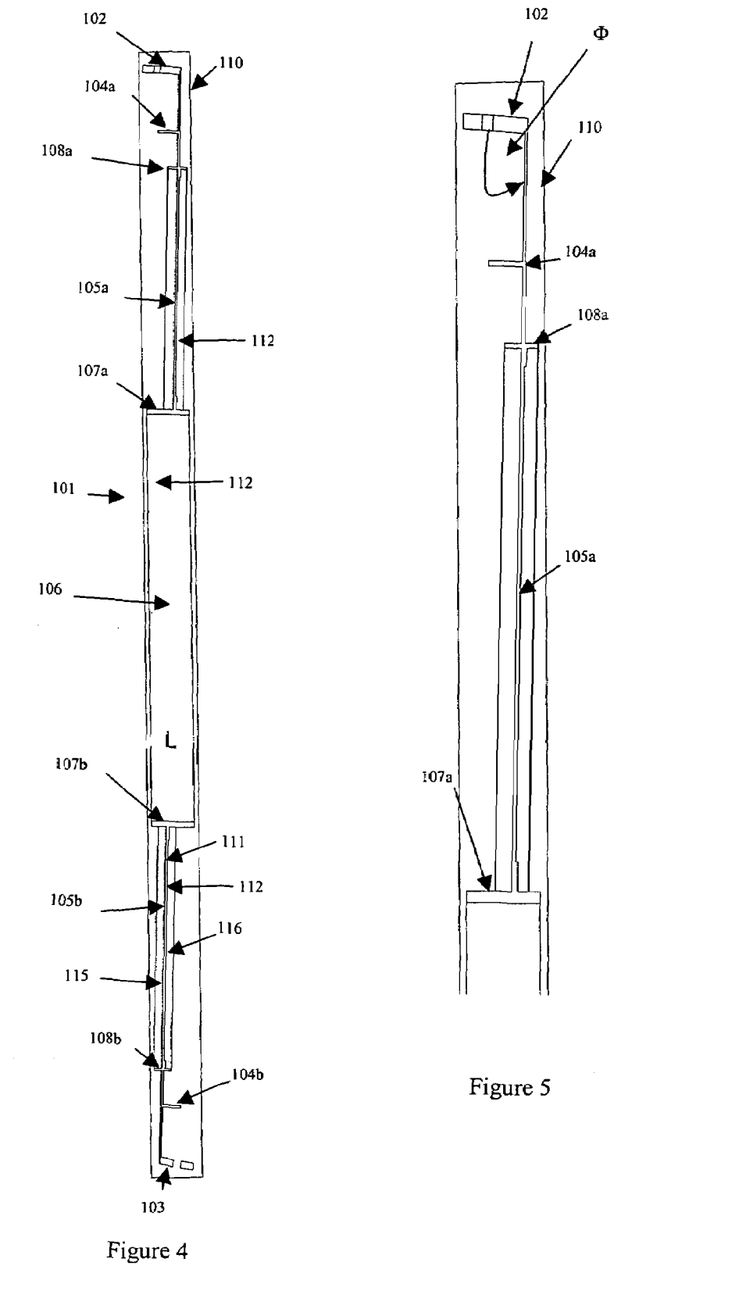
FIG. 4 is a schematic cross-section of a rib in accordance with the embodiment of the present invention showing the spatial relationship between the rib and the billet from which the rib is machined.
FIG. 5 is an enlarged view of a portion of the cross-section of FIG. 4 showing a preferred angular relationship between the rib web and the rib feet

FIGS. 4 and 5 show a cross-section through a rib 101 in accordance with the embodiment of the present invention. The rib 101 includes a web 112 that extends between first 102 and second 103 sets of rib feet. Each rib foot 102, 103, being in the form of a flange, facilitates fixing of the rib 101 to the wing skin of the wing. The rib is about 3.0 m in length and about 1.4 m wide. Each foot projects from the web by about 50 mm. The rib has a maximum thickness of about 60 mm. The rib is therefore of a size suitable for use in a wing-box of a large (100+seater) passenger aircraft. The rib 101 is produced by machining an aluminum alloy billet 110 with a 7-axis flexible automated milling machine. The billet is cuboidal in shape and measures 3.1 m×1.5 m×70 mm. The method by which the rib 101 is produced comprises machining away material on all sides of the billet 110 to form the rib 101, the material that forms the web 112 extending diagonally across the middle of the billet 110. The web 112 has a first face on a first side 115 and a second face on a second side 116 opposite to the first side 115 of the web 112. The first set of rib feet 102 extend more to the first side 115 than to the second side 116 of the web 112 and the second set of rib feet 103 extend more to the second side 116 than to the first side 115 of the web 112.

The rib 101 of the present invention is provided with stiffeners 104a, 104b, 107a, 107b, 108a, 108b and vertical stiffeners 111 to increase the strength of the rib 101. The web 112 comprises panels 105a, 105b disposed between the stiffeners.

The web 112 is formed diagonally across the billet 110, thus the web 112 includes very little material from the surface of the billet 110, and furthermore includes material from the billet across its depth. Thus the likelihood of any residual stresses in the billet 110 producing unwanted deformations in the web 112 is reduced. Furthermore, diagonal machining of the web 112 from the middle of the billet permits the stiffeners 104a, 104b, 107a, 107b, 108a, 108b to be formed on both sides of the web 112, thus providing for equal load and weight distribution on each side 115, 116 of the web 112. For instance, stiffeners 108a and 108b extend from both sides 115, 116 of the web 112, thus providing equal weight (from these particular stiffeners) on each side 115, 116 of the web 112. The neutral axes of the stiffeners 108a, 108b are in the shear plane (essentially the plane of the web 112), thus permitting stiffeners of smaller section to be used in comparison to the rib of the prior art where the neutral axis of the stiffener is displaced away from the web 112. Stiffeners 104a and 104b extend in mutually opposite directions from the web 112, the former extending to the first side 115 and the latter extending to the second side 116, the stiffeners thus being provided symmetrically about the centre of the rib 101. Such a symmetrical arrangement provides optimal structural stiffness and represents a lower mass solution than the mass in the case where stiffeners are provided on one side only of the centre plane of the rib. Likewise, stiffeners 107a, 107b are symmetrically arranged on both sides 115, 116 of web 112.

The formation of the web 112 from a diagonal of the billet 110 allows the rib feet 102, 103 to extend in mutually different directions, the first set of rib feet 102 extending to the first side 115 and the second set of rib feet 103 extending to the second side 116. This arrangement further allows the angle between the rib feet 102, 103 and the web 112 to be greater than 90 degrees. The angle phi between the rib foot 102 and web 112 in FIG. 5 is about 105 degrees.

It will be appreciated that various modifications may be made to the above-described embodiments of the invention without departing from the spirit of the invention. For example, those skilled in the art will realise that the rib feet may extend at any angle from the web 112, but that it is particularly advantageous for the angle to be more than about 90 degrees. Increasing the angle between the rib foot 102 and the web 112 increases the ease by which the rib 101 is machined from the billet 110 and increases access to the rib 101 during and after fixing in the aircraft wing box. Of course other design constraints will limit the maximum angle in practice.

It is not necessary for the material that forms the web 112 to extend diagonally across the billet 110. The material that forms the web 112 merely includes at least a portion that is positioned in a region remote from any side of the billet 110.

The process of machining the billet may use any process capable of removing material from the billet, such as milling and machining, but should not be limited to those methods using tools and components that physically engage with the billet to remove material. It is anticipated, for example, that lasers may be at least partly used to machine the rib in the methods of the present invention.

The invention claimed is:

1. A rib for use in an aircraft, the rib comprising
a web extending between first and second flanged portions, each flanged portion having a flange that facilitates fixing of the rib to another component of the aircraft,
the web having a first face on a first side and a second face on a second side opposite to the first side of the web, wherein
the sum volume of all of the flanged material, at the same end of the rib as the first flanged portion, extending to the first side is significantly greater than the sum volume of material, if any, of the sum volume of all of the flanged material, at the same end of the rib as the first flanged portion, extending to the second side,
the sum volume of all of the flanged material, at the same end of the rib as the second flanged portion, extending to the second side is significantly greater than the sum volume of material, if any, of the sum volume of all of the flanged material, at the same end of the rib as the second flanged portion, extending to the first side, and
each of the first and second flanged portions extend from the web at an angle of between about 95 degrees and about 120 degrees.

2. An aircraft structure defining an aerofoil surface, the structure comprising a skin, and at least one rib according to claim 1.

3. A rib according to claim 1, wherein the web and flanged portions are defined by a monolithic structure.

4. A rib according to claim 1, wherein each of said first and second flanged portions is in the form of a plurality of separately discernable rib feet, such that said flange of each flanged portion is in the form of one of the rib feet.

5. A rib according to claim 1, wherein the web of the rib includes a first strengthening formation on the first side and a second strengthening formation on the second side.

6. A rib according to claim 5, wherein the rib includes strengthening formations both on the first side and on the second side and the sum volume of material of all of the strengthening formations on the first side is within a factor of ten of the sum volume of material of all of the strengthening formations on the second side.

7. A rib according to claim 5, wherein the rib includes a plurality of strengthening formations on the first side and on the second side, each of the strengthening formations on the first side being associated with a corresponding strengthening formation on the second side.

8. A rib according to claim 7, wherein the pairs of associated strengthening formations on the first and second sides are positioned immediately opposite each other, being separated by the web of the rib.

9. A rib for use in an aircraft, the rib comprising
a web extending between first and second flanged portions, each flanged portion having a flange that facilitates fixing of the rib to another component of the aircraft,
the web having a first face on a first side and a second face on a second side opposite to the first side of the web, wherein
the flange of the first flanged portion extends to the first side,
the flange of the second flanged portion extends to the second side,
the web includes a first strengthening formation that extends out from the first face of the web and a second strengthening formation that extends out from the second face of the web, and
wherein each of the first and second flanged portions extends from the web at an angle of between about 95 degrees and about 120 degrees.

10. An aircraft structure defining an aerofoil surface, the structure comprising a skin, and at least one rib according to claim 9.

11. A rib according to claim 9, wherein the flanged portions and the web including the first strengthening formation and the second strengthening formation are defined by a monolithic structure.

12. A rib according to claim 9, wherein each of said first and second flanged portions is in the form of a plurality of separately discernable rib feet, such that said flange of each flanged portion is in the form of one of the rib feet.

13. A rib according to claim 9, wherein the rib includes a plurality of strengthening formations on the first side and on the second side, each of the strengthening formations on the first side being associated with a corresponding strengthening formation on the second side.

14. A rib according to claim 13, wherein the pairs of associated strengthening formations on the first and second sides are positioned immediately opposite each other, being separated by the web of the rib.

15. A rib for use in an aircraft, the rib comprising
a web extending between first and second rows of rib feet for facilitating fixing of the rib to another component of the aircraft,
the web having a first face on a first side and a second face on a second side opposite to the first side of the web, wherein
the first row of rib feet extend to the first side and extend away from the web at an angle of between about 95 degrees and about 120 degrees,
the second row of rib feet extend to the second side, and extend away from the web at an angle of between about 95 degrees and about 120 degrees.

16. An aircraft structure defining an aerofoil surface, the structure comprising a skin, and at least one rib according to claim 15.

17. A rib according to claim 15, wherein the first and second rows of rib feet and the web are defined by a monolithic structure.

18. A rib for use in an aircraft, the rib comprising
a web extending between first and second rows of rib feet for facilitating fixing of the rib to another component of the aircraft,
the web having a first face on a first side and a second face on a second side opposite to the first side of the web, wherein
said web extends diagonally from an intersection of the web and the first row of rib feet to the intersection of the web and the second row of rib feet,
the first row of rib feet extend to the first side and extend away from the web at an angle of between about 95 degrees and about 120 degrees,
the second row of rib feet extends to the second side at an angle of between about 95 degrees and about 120 degrees,
the rib includes a plurality of horizontal and vertical stiffeners disposed across the first face of the web, and
the rib includes a plurality of horizontal and vertical stiffeners disposed across the second face of the web.

* * * * *

UNITED STATES PATENT AND TRADEMARK OFFICE
CERTIFICATE OF CORRECTION

PATENT NO.      : 7,578,473 B2                                                       Page 1 of 1
APPLICATION NO. : 11/020988
DATED           : August 25, 2009
INVENTOR(S)     : David James Shortman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1218 days.

Signed and Sealed this

Seventh Day of September, 2010

David J. Kappos
*Director of the United States Patent and Trademark Office*